(12) United States Patent
Anderson

(10) Patent No.: US 7,574,926 B2
(45) Date of Patent: Aug. 18, 2009

(54) ROTARY CAM DRIVEN SENSOR AND FEEDBACK CONTROL

(75) Inventor: Jack Conan Anderson, Madrid, IA (US)

(73) Assignee: Deere & Company, Moline, IL (US)

( * ) Notice: Subject to any disclaimer, the term of this patent is extended or adjusted under 35 U.S.C. 154(b) by 388 days.

(21) Appl. No.: 11/348,054

(22) Filed: Feb. 6, 2006

(65) Prior Publication Data
US 2006/0150606 A1    Jul. 13, 2006

Related U.S. Application Data

(63) Continuation-in-part of application No. 10/741,118, filed on Dec. 19, 2003, now abandoned.

(51) Int. Cl.
*G01L 3/00* (2006.01)
(52) U.S. Cl. .................................................. 73/862.325
(58) Field of Classification Search ............. 73/862.325
See application file for complete search history.

(56) References Cited

U.S. PATENT DOCUMENTS

| 2,078,596 | A | * | 4/1937 | Barr et al. .................... 280/761 |
| 2,785,909 | A | * | 3/1957 | Barnard ....................... 280/426 |
| 3,144,785 | A | * | 8/1964 | Steiner et al. ................. 74/493 |
| 4,573,348 | A | * | 3/1986 | Abramson et al. ........ 73/115.02 |
| 5,123,279 | A | | 6/1992 | Henein et al. ............... 73/118.1 |
| 5,597,172 | A | | 1/1997 | Maiwald et al. ............. 280/672 |
| 5,636,703 | A | | 6/1997 | Papke et al. .................. 180/400 |
| 6,293,022 | B1 | * | 9/2001 | Chino et al. ............. 33/203.18 |
| 6,502,839 | B1 | * | 1/2003 | Chino et al. ........... 280/93.512 |
| 6,568,696 | B2 | * | 5/2003 | Osborn et al. ............... 280/93.5 |
| 7,097,184 | B2 | * | 8/2006 | Kapaan et al. ......... 280/93.512 |
| 7,204,779 | B2 | * | 4/2007 | Irikura et al. ............... 475/230 |
| 2005/0132686 | A1 | | 6/2005 | Anderson ....................... 56/28 |

OTHER PUBLICATIONS

Bosch Wegaufnehmer, Sensor Drawing, Jul. 2001.
Rexroth Bosch Group, Electronic and Hydraulic Hitch Control HER internet brochure, printed Feb. 6, 2006.

* cited by examiner

*Primary Examiner*—Lisa M Caputo
*Assistant Examiner*—Octavia Davis

(57) ABSTRACT

A shaft angle sensing arrangement for an implement steerable axle includes a shaft rotatable about a shaft axis within shaft mounting structure, a cam ring with a cam surface mounted over the shaft, and a threaded aperture in the axle housing adjacent the cam surface. As the cam ring rotates with the shaft, the distance between the cam surface and the support area varies. A displacement transducer threaded into the aperture includes a contact member engaging the cam surface so that rotation of the shaft causes the contact member to move dependent on the angular position of the shaft to provide a shaft position feedback signal to an automatic position controller or readout device.

20 Claims, 2 Drawing Sheets

ROTARY CAM DRIVEN SENSOR AND FEEDBACK CONTROL

This is a continuation-in-part of U.S. application Ser. No. 10/741,118 entitled ROTARY CAM DRIVEN SENSOR AND FEEDBACK CONTROL filed 19 Dec. 2003, now abandoned.

FIELD OF THE INVENTION

The present invention relates to sensors providing an indication of rotational position and, more specifically to shaft rotation sensors such as steering position sensors for off-road vehicles and other implements.

BACKGROUND OF THE INVENTION

Rotation position sensors are used for providing position feedback in off-road vehicles or implements such as cotton harvesters, combines, sprayers, swathers and lawn and garden, construction or forestry equipment. Feedback can be required for automatic steering, multi-wheel steering, parallel or contour tracking systems, rate control, mapping and various other shaft angle and angle-related functions. Such sensors are shown, for example, in U.S. Pat. No. 5,636,703 entitled ROTARY AXLE-MOUNTED FEEDBACK TRANSDUCER. An electronic and hydraulic hitch control EHR is commercially available from the Rexroth Bosch Group and includes an inductive linear displacement sensor for position control. Such devices are often operated in extreme conditions and some are exposed to passing plant material, dirt and other debris. As a result of this exposure, the feedback mechanisms can be damaged during operation, and parts subject to wear have to be replaced to avoid inaccurate readings. Space and location limitations make access for installation, maintenance, repair and calibration difficult. Devices such as shown in the aforementioned U.S. Pat. No. 5,636,703 require special protective caps and special fixtures for set-up. Providing a convenient location, proper motion paths and adequate shielding have been continuing sources of problems.

SUMMARY OF THE INVENTION

It is therefore an object of the present invention to provide an improved angular position feedback sensor arrangement for an off-road vehicle or implement subject to extreme environmental conditions. It is a further object to provide such a sensor which overcomes most or all of the aforementioned problems.

It is another object of the present invention to provide an improved angular position feedback sensor arrangement for a vehicle or implement which is more compact, reliable and longer-lasting than at least most previously available sensor arrangements. It is yet another object of the present invention to provide such an arrangement which has a minimum number of moving parts and advantageously utilizes existing shaft structure on the vehicle or implement. It is a further object to provide such an arrangement which is particularly useful with a kingpin or similar steering shaft structure for providing a steering feedback control signal.

A cam drive installed on a kingpin or similar shaft structure and driving a displacement transducer provides angular feedback in an implement or off-road vehicle subject to extreme environmental conditions. The cam is installed against a shoulder on the kingpin and secured by a pin. A clearance hole in a knee casting permits access to the cam. The sensor is threaded into the steering cylinder anchor which is bolted to the knee over the area with the clearance hole. A jam nut locks the sensor in position. If angular feedback is not required, a threaded plug replaces the sensor to seal the area. The only moving part in addition to the previously existing kingpin is the displacement transducer, and the cam is protected by the surrounding structure so that sensor life, reliability and accuracy are improved compared to most previously available feedback systems. Special sealed protective caps and similar protective structure which add cost and complexity to the system are not required. Feedback for steering, tracking, rate control, mapping, and various other functions such as implement height, folding and tool position control or the like can be provided simply and reliably utilizing existing shaft structure on an implement or vehicle. The cam and sensor provide a continuously variable signal over a wide range of shaft or kingpin rotational angles.

These and other objects, features and advantages of the present invention will become apparent on reading the following detailed description in view of the drawings.

DESCRIPTION OF THE PREFERRED EMBODIMENT

Figure 1:
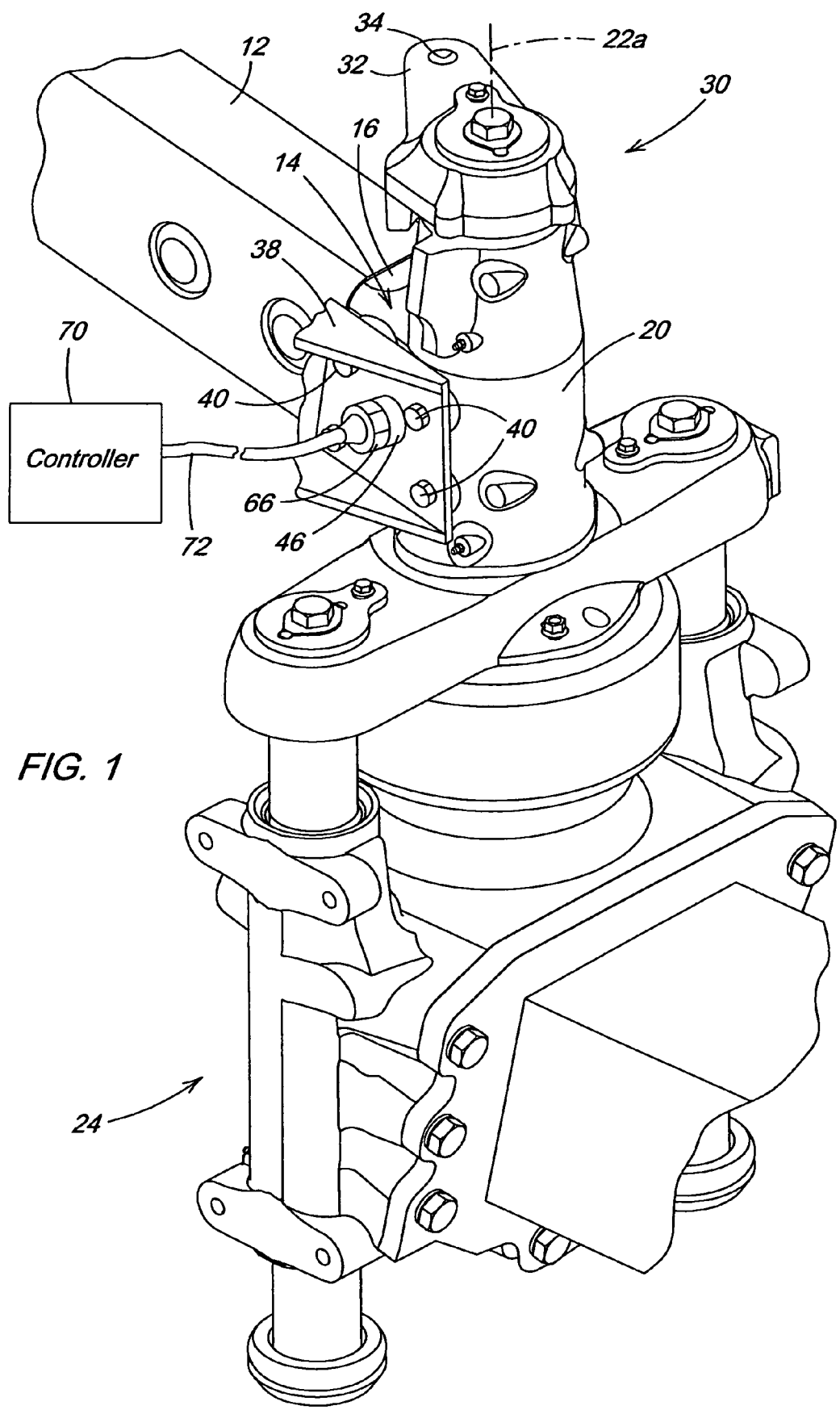
FIG. 1 is a perspective view of a portion of a steerable wheel axle assembly for an implement such as a field sprayer with a position feedback sensor assembly attached.

Referring to the drawing figures, therein is shown a portion of a steerable axle assembly 10 for a vehicle or implement, such as an agricultural field sprayer, which may be operated in an environment wherein dirt, debris, plants or plant residue may be encountered. A transverse tubular beam 12 for an implement frame (not shown) supports a cast knee joint 14 having an inward end 16 supported in the outer end of the beam 12 and a downwardly directed journal or kingpin support area 20. A kingpin 22 (FIG. 2) or other shaft structure is rotatably mounted in the knee journal 20, and a wheel assembly 24 is fixed to the lower end of the kingpin 22 for rotation about the kingpin axis.

A steering arm assembly 30 is fixed to the top portion of the kingpin 22 and includes an inwardly extending steering arm 32 having a radially outwardly positioned aperture 34 adapted for pivotal attachment of the arm to one end of a steering control cylinder (not shown) for rotating the kingpin 22 and turning the wheel assembly 24. A steering cylinder support arm or anchor 38 is connected to the support area 20 of the knee joint 14 and extends upwardly and inwardly from the support area to a location generally level with the steering arm 32 for receiving the opposite end of the steering control cylinder. Attaching bolts 40 are threaded into bores located in the cast knee joint 14 to secure the anchor to the cast knee joint. Although a particular axle assembly is shown, it is to be understood that other types of axle assemblies and steering arm arrangements that are commonly available may also be used with the present invention, including A round access opening 44 (FIG. 2) located between the bores for the bolts 40 extends perpendicularly to the axis 22a completely through the sidewall of the knee journal 20. A threaded sensor-receiving apertured boss 46 in the anchor 38 aligns with the access opening 44.

Figure 2:
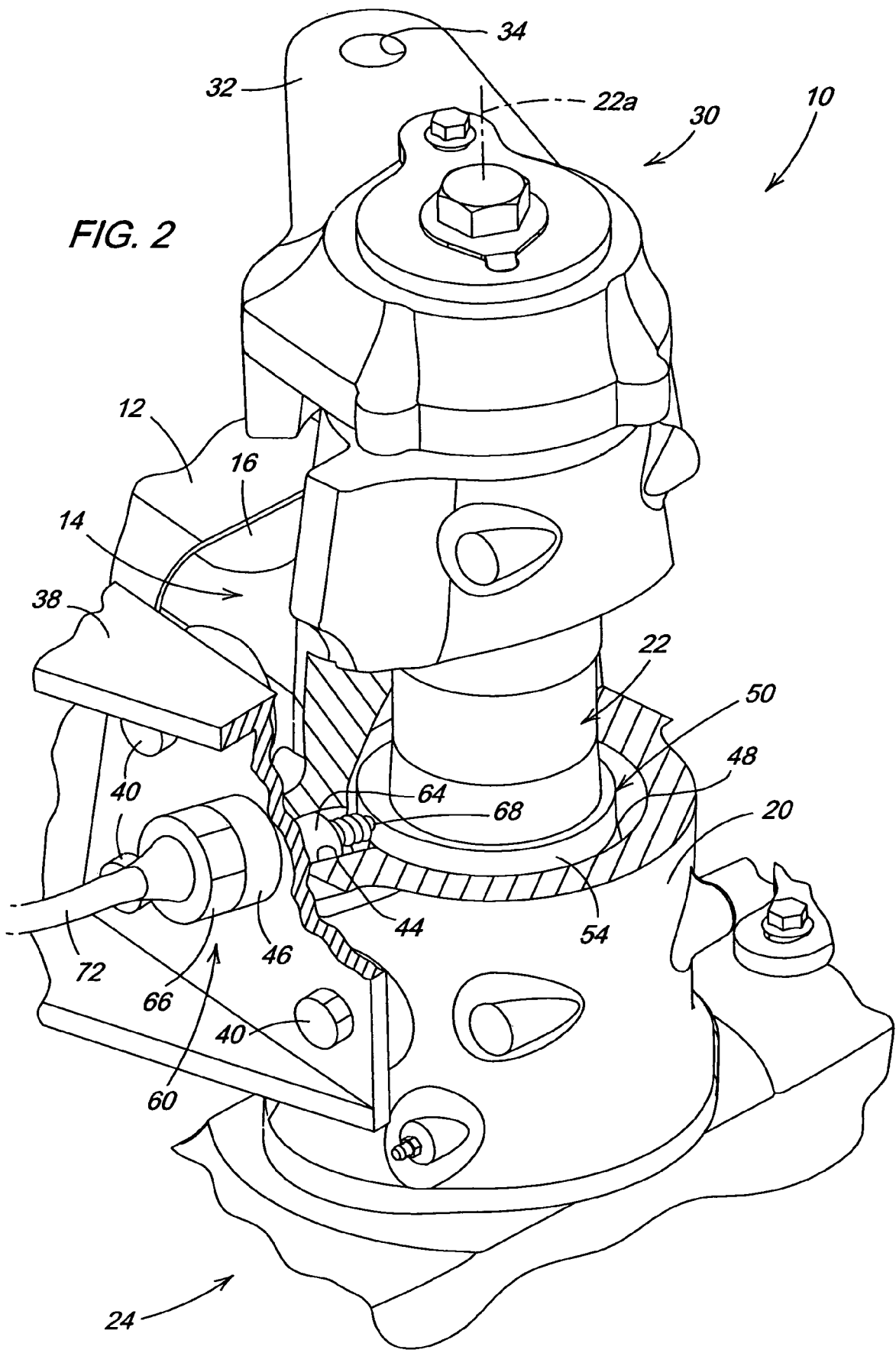
FIG. 2 is an enlarged view of a portion of the assembly shown in FIG. 1 with portions broken away to show the cam drive and displacement transducer for the feedback sensor assembly.

The kingpin 22 is shouldered at a location 48 adjacent the access opening 44 (FIG. 2). A cam 50 having a generally ring-shaped configuration is positioned over the kingpin and rests against the shouldered location 48. The interior circumference of the cam 50 conforms to the kingpin 22 and provides a tight fit at the shouldered location 48. A pin or other conventional indexing structure secures the cam 50 against rotation relative to the kingpin 22. The cam 50 includes an outer cam surface 54 facing the access opening 44, and the distance between the cam surface 54 and the pin axis 22a varies depending on angular location. Therefore, as the kingpin 22 is rotated with steering of the implement, the distance between the access opening 44 and the area of the cam surface 54 adjacent the opening will vary. As shown in FIG. 2, the cam 50 when viewed at the access opening 44 has a thickness which gradually increases with rotation of the kingpin 22 in the counterclockwise direction and which gradually decreases with clockwise rotation of the kingpin.

A displacement sensor or transducer 60 includes a threaded shaft portion 64 threaded into the apertured boss 46 of the anchor 38. Alternatively, the access opening 44 may be threaded for receiving the threaded shaft portion of the transducer, or the transducer may otherwise may otherwise be supported in a conventional manner within the opening 44. The sensor 60 may be the type shown with the aforementioned electronic and hydraulic hitch control available from Rexroth Bosch Group. A lock nut 66 secures the transducer in the desired position relative to the cam 50. A contact member 68 is biased inwardly from the shaft portion 64 into contact with the cam surface 54. As the kingpin 22 rotates, the contact member 68 will move in or out depending on the amount and direction of rotation, and a corresponding shaft angle signal will be provided by the transducer 60 to a controller or other electronic device 70 via line 72 for providing information for implement steering, implement tracking, GPS mapping functions and the like. The construction is simple and inexpensive and provides accurate and repeatable shaft angle feedback. The transducer 60 and the cam 50 are completely shielded from the effects of dirt, debris and passing plant material. If feedback for steering, implement location, shaft angle, shaft rate of rotation or the like is not necessary on the implement, the transducer 60 can be replaced with a threaded plug to seal the knee area.

Having described the preferred embodiment, it will become apparent that various modifications can be made without departing from the scope of the invention as defined in the accompanying claims. For example, a shaft, rather than a kingpin, could utilize a similar cam and transducer arrangement in a position control which is connected to the displacement transducer for receiving a feedback signal for determining and controlling variables such as implement height, implement fold position and tool position.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. A shaft angle sensing arrangement for a steerable axle comprising a shaft connected to a steering arm and rotatable about a shaft axis within shaft mounting structure, a cam mounted on the shaft for rotation with the shaft about the shaft axis, a support area on the shaft mounting structure, the cam having a cam surface, wherein distance between the cam surface and the support area varies as the shaft rotates, and a displacement transducer carried by the support area and including a contact member engaging the cam surface, wherein rotation of the shaft causes the contact member to move in and out in a direction generally perpendicular to the shaft axis, the movement dependent on the angular position of the shaft.

2. The angle sensing arrangement as set forth in claim 1 wherein the cam comprises a ring member secured around the shaft adjacent the support area and providing a continuously variable displacement over a range of shaft rotation angles.

3. The angle sensing arrangement as set forth in claim 1 wherein the displacement transducer comprises a threaded member and the shaft mounting structure supports a mating threaded aperture receiving the threaded member.

4. The angle sensing arrangement as set forth in claim 1 wherein the shaft comprises a kingpin.

5. The angle sensing arrangement as set forth in claim 4 wherein the kingpin includes a shouldered area and the cam is positioned around the kingpin and rests against the shouldered area.

6. The angle sensing arrangement as set forth in claim 4 wherein the support area comprises an axle casting generally closing the area around the cam, and the contact member is protectively supported by the axle casting so that the cam surface and the contact member are protected from dirt, debris and plant material passing the steerable axle structure.

7. The angle sensing arrangement as set forth in claim 1 wherein the shaft comprises a portion of steering control for an agricultural implement, and further comprising a controller connected to the displacement transducer for receiving a feedback signal providing information about at least one of the following functions:

implement steering, implement tracking, and GPS mapping.

8. The angle sensing arrangement as set forth in claim 1 further comprising a controller connected to the displacement transducer for receiving a feedback signal providing information about shaft rate of rotation.

9. The angle sensing arrangement as set forth in claim 1 wherein the contact member is movable linearly and extends perpendicularly to the cam surface at an area of contact between the contact member and the cam.

10. The angle sensing arrangement as set forth in claim 9 wherein the transducer is threaded into the support area, and the contact member is adjustable relative to the cam by variably threading the transducer into the support area.

11. A steering angle sensing arrangement comprising a kingpin rotatable about a kingpin axis within axle structure, a cam mounted on the kingpin for rotation about the kingpin axis and including a cam surface rotatable with the kingpin about the kingpin axis, the axle structure including a transducer support area, and a displacement transducer carried by the transducer support area and including a contact member engaging the cam surface, wherein rotation cam surface causes the contact member to move generally perpendicularly to the kingpin axis and provide a steering signal dependent on the angular position of the kingpin.

12. The steering angle sensing arrangement as set forth in claim 11 wherein the cam comprises an annular ring member secured around the shaft adjacent the transducer support area.

13. The steering angle sensing arrangement as set forth in claim 11 wherein the displacement transducer comprises a threaded member and a mating threaded aperture opening towards the cam surface and receiving the threaded member.

14. The angle sensing arrangement as set forth in claim 11 wherein the kingpin includes a shouldered area and the cam is positioned around the kingpin and rests against the shouldered area.

15. The angle sensing arrangement as set forth in claim 11 wherein the transducer support area comprises a casting generally closing the area around the cam, and the contact member is protectively supported by the axle casting so that the cam surface and the contact member are protected from dirt, debris and plant material passing the axle structure.

16. The angle sensing arrangement as set forth in claim 11 wherein the kingpin is rotatable over a range of steering angles and wherein the cam surface provides a generally continuously variable signal generally over the range of steering angles.

17. The angle sensing arrangement as set forth in claim 16 wherein the cam generally encircles the kingpin.

18. The angle sensing arrangement as set forth in claim 11 wherein the contact member is movable linearly and extends generally perpendicularly to the cam surface at an area of contact between the contact member and the cam.

19. The angle sensing arrangement as set forth in claim 18 wherein the transducer is threaded into the support area, and the contact member is adjustable relative to the cam by variably threading the transducer into the support area.

20. The angle sensing arrangement as set forth in claim 11 wherein the transducer support area comprises an axle knee joint.

\* \* \* \* \*